(12) United States Patent
Hua et al.

(10) Patent No.: US 11,093,068 B2
(45) Date of Patent: Aug. 17, 2021

(54) TOUCH CONTROL ARRAY SUBSTRATE AND TOUCH CONTROL DISPLAY APPARATUS

(71) Applicants: BOE Technology Group Co., Ltd., Beijing (CN); Beijing BOE Optoelectronics Technology Co., Ltd., Beijing (CN)

(72) Inventors: Gang Hua, Beijing (CN); Lei Mi, Beijing (CN); Yanna Xue, Beijing (CN); Yong Zhang, Beijing (CN); Zhiying Bao, Beijing (CN); Lu Bai, Beijing (CN); Jingpeng Wang, Beijing (CN); Haobo Fang, Beijing (CN); Wenjun Xiao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 520 days.

(21) Appl. No.: 16/080,608

(22) PCT Filed: Mar. 22, 2018

(86) PCT No.: PCT/CN2018/079959
§ 371 (c)(1),
(2) Date: Aug. 28, 2018

(87) PCT Pub. No.: WO2019/024516
PCT Pub. Date: Feb. 7, 2019

(65) Prior Publication Data
US 2021/0181886 A1    Jun. 17, 2021

(30) Foreign Application Priority Data

Aug. 2, 2017 (CN) .......................... 201710650287.6

(51) Int. Cl.
*G06F 3/041*     (2006.01)
*G02F 1/1333*    (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS

2003/0038908 A1* 2/2003 Ikeno ................ G02F 1/136227
349/113
2010/0200875 A1    8/2010 Takei
(Continued)

FOREIGN PATENT DOCUMENTS

CN    1896823 A    1/2007
CN    103235457 A    8/2013
(Continued)

OTHER PUBLICATIONS

First Office Action in the Chinese Patent Application No. 201710650287.6, dated Jul. 8, 2019; English translation attached.
(Continued)

*Primary Examiner* — Christopher R Lamb
(74) *Attorney, Agent, or Firm* — Intellectual Valley Law, P.C.

(57) ABSTRACT

The present application provides a touch control array substrate. The touch control array substrate includes a touch electrode layer having a plurality of touch electrode blocks configured to detect a touch and configured to provide at
(Continued)

least a portion of back light for image display in the touch control array substrate by reflecting ambient light.

17 Claims, 8 Drawing Sheets

(51) Int. Cl.
*G06F 3/044* (2006.01)
*G02F 1/1362* (2006.01)
*G02F 1/1368* (2006.01)

(52) U.S. Cl.
CPC .. *G02F 1/136227* (2013.01); *G02F 1/136286* (2013.01); *G06F 3/0412* (2013.01); *G06F 3/0445* (2019.05)

(56) References Cited

U.S. PATENT DOCUMENTS

| | | | |
|---|---|---|---|
| 2013/0215075 A1* | 8/2013 | Lee | G06F 3/0412 345/174 |
| 2014/0320439 A1 | 10/2014 | Yang | |
| 2016/0190500 A1 | 6/2016 | Watabe et al. | |
| 2016/0274421 A1 | 9/2016 | Hirakata | |
| 2017/0184895 A1* | 6/2017 | Xu | G02F 1/134363 |
| 2017/0205959 A1 | 7/2017 | Seong | |

FOREIGN PATENT DOCUMENTS

| | | |
|---|---|---|
| CN | 106502468 A | 3/2017 |
| CN | 106896961 A | 6/2017 |
| KR | 20100077083 A | 7/2010 |

OTHER PUBLICATIONS

International Search Report & Written Opinion dated Jun. 26, 2018, regarding PCT/CN2018/079959.

Second Office Action in the Chinese Patent Application No. 201710650287.6, dated Apr. 3, 2020; English translation attached.

* cited by examiner

TOUCH CONTROL ARRAY SUBSTRATE AND TOUCH CONTROL DISPLAY APPARATUS

CROSS-REFERENCE TO RELATED APPLICATION

This application is a national stage application under 35 U.S.C. § 371 of International Application No. PCT/CN2018/079959, filed Mar. 22, 2018, which claims priority to Chinese Patent Application No. 201710650287.6, filed Aug. 2, 2017, the contents of which are incorporated by reference in the entirety.

TECHNICAL FIELD

The present invention relates to display technology, more particularly, to a touch control array substrate and a touch control display apparatus.

BACKGROUND

Touch apparatuses have been widely used in many electronic devices such as mobile phones, computer display panels, touch screens, satellite navigation devices, digital cameras, etc. Examples of touch apparatuses include a mutual-capacitance touch control apparatus and a self-capacitance touch control apparatus. In a mutual-capacitance touch control apparatus, the touch electrodes include multiple touch scanning electrodes (Tx) and multiple touch sensing electrodes (Rx). In a self-capacitance touch control apparatus, the touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the first electrode and the second electrode being touched may be determined. In detecting touch events, the mutual capacitive touch display panel examines the touch scanning electrode array and the touch sensing electrode array sequentially. Touch resolution correlates with the distance between adjacent conductive channels. A smaller distance between adjacent conductive channels results in a higher touch resolution.

SUMMARY

In one aspect, the present invention provides a touch control array substrate comprising a touch electrode layer having a plurality of touch electrode blocks configured to detect a touch and configured to provide at least a portion of back light for image display in the touch control array substrate by reflecting ambient light.

Optionally, the touch control array substrate further comprises a base substrate; a plurality of thin film transistors on the base substrate, each of the plurality of thin film transistors in one of a plurality of subpixel areas; a pixel electrode in each of the plurality of subpixel areas; and a passivation layer on a side of the pixel electrode distal to the base substrate; wherein the touch electrode layer is on a side of the passivation layer distal to the pixel electrode; and an orthographic projection of the pixel electrode on the base substrate at least partially overlaps with an orthographic projection of one of the plurality of touch electrode blocks on the base substrate.

Optionally, each of the plurality of touch electrode blocks is in one of the plurality of subpixel areas, and is spaced apart from adjacent touch electrode blocks of the plurality of touch electrode blocks in adjacent subpixel areas of the plurality of subpixel areas.

Optionally, each of the plurality of touch electrode blocks spans over multiple subpixel areas of the plurality of subpixel areas; and an orthographic projection of each of the plurality of touch electrode blocks on the base substrate at least partially overlaps with an orthographic projection of each of multiple ones of the pixel electrode in multiple subpixel areas of the plurality of subpixel areas.

Optionally, at least a portion of each of the plurality of touch electrode blocks is light reflective; and the plurality of touch electrode blocks are configured to provide at least a portion of back light for image display.

Optionally, substantially an entirety of each of the plurality of touch electrode blocks is light reflective; and the plurality of touch electrode blocks are configured to provide back light for image display.

Optionally, each of the plurality of touch electrode blocks comprises a reflective part and a substantially transparent part; the reflective part is light reflective; the substantially transparent part is substantially transparent; and the reflective part of each of the plurality of touch electrode blocks is configured to provide a portion of back light for image display.

Optionally, the touch control array substrate further comprises a plurality of touch signal lines respectively connected to the plurality of touch electrode blocks; and a plurality of data lines, one of which is configured to provide a data signal to the pixel electrode.

Optionally, the touch control array substrate further comprises an inter-layer dielectric layer on a side of the plurality of data lines and the plurality of touch signal lines distal to the base substrate; a passivation layer on a side of the touch electrode layer distal to the base substrate; and a pixel electrode on a side of the passivation layer distal to the base substrate; wherein the touch electrode layer is on a side of the inter-layer dielectric layer distal to the base substrate; and the plurality of touch signal lines and the plurality of data lines are in a same layer and comprise a same material.

Optionally, each of the plurality of thin film transistors comprises a gate electrode, an active layer, a source electrode and a drain electrode, and a gate insulating layer between the active layer and the gate electrode; and the plurality of data lines, the plurality of touch signal lines, the source electrode, and the drain electrode are in a same layer and comprise a same material.

Optionally, the touch control array substrate further comprises a plurality of first vias extending through the inter-layer dielectric layer, and a plurality of second vias extending through the passivation layer and the inter-layer dielectric layer; wherein each of the plurality of touch electrode blocks is electrically connected to one of the plurality of touch signal lines through one or more of the plurality of first vias; and the pixel electrode is electrically connected to a drain electrode of one of the plurality of thin film transistors through one or more of the plurality of second vias.

Optionally, each of the plurality of touch electrode blocks is electrically connected to one of the plurality of touch signal lines through multiple ones of the plurality of first vias, first terminals of the multiple ones of the plurality of first vias are connected to a same one of the plurality of touch electrode blocks, and second terminals of the multiple ones of the plurality of first vias are connected to a same one of the plurality of touch signal lines.

Optionally, the touch control array substrate is configured to be operated in a time-division driving mode comprising a display mode and a touch control mode; the plurality of touch electrode blocks are a plurality of common electrodes for applying a common voltage signal during the display mode; and the plurality of touch electrode blocks are touch electrode blocks for conducting touch signals during the touch control mode.

In another aspect, the present invention provides a touch control display apparatus comprising the touch control array substrate described herein and a counter substrate facing the touch control array substrate.

Optionally, the touch control array substrate further comprises a base substrate; a plurality of thin film transistors on the base substrate, each of the plurality of thin film transistors in one of a plurality of subpixel areas; a pixel electrode in each of the plurality of subpixel areas; and a passivation layer on a side of the pixel electrode distal to the base substrate; wherein the touch electrode layer is on a side of the passivation layer distal to the pixel electrode; and an orthographic projection of the pixel electrode on the base substrate at least partially overlaps with an orthographic projection of one of the plurality of touch electrode blocks on the base substrate.

Optionally, each of the plurality of touch electrode blocks comprises a reflective part and a substantially transparent part; the reflective part is light reflective; the substantially transparent part is substantially transparent; and the reflective part of each of the plurality of touch electrode blocks is configured to provide a portion of back light for image display; wherein the touch control display apparatus further comprises a back light module on a side of the touch control array substrate distal to the counter substrate, and configured to provide back light through the substantially transparent part.

Optionally, the back light module is configured to be turned on when a level of ambient light intensity is lower than a threshold value, and configured to be turned off when the level of ambient light intensity is equal to or higher than the threshold value.

In another aspect, the present invention provides a method of driving the touch control display apparatus described herein, comprising operating the touch control display apparatus in a time-division driving mode comprising a display mode and a touch control mode; wherein the method comprises applying a common voltage signal during the display mode to the plurality of touch electrode blocks; and conducting touch signals through the plurality of touch electrode blocks during the touch control mode.

Optionally, the touch control array substrate further comprises a plurality of touch signal lines respectively connected to the plurality of touch electrode blocks, and a plurality of data lines, one of which is configured to provide a data signal to the pixel electrode; wherein the touch control display apparatus further comprises a display driver integrated circuit chip electrically connected to the plurality of touch signal lines; and a touch driver integrated circuit chip electrically connected to the plurality of touch signal lines; the method further comprises generating the common voltage signal by the display driver integrated circuit chip and providing the common voltage signal to the plurality of touch electrode blocks during the display mode; and generating touch scanning signals by the touch driver integrated circuit chip and providing the touch scanning signals to the plurality of touch electrode blocks during the touch control mode.

Optionally, the display driver integrated circuit chip and the touch driver integrated circuit chip are integrated as a touch and display driver integrated (TDDI) circuit chip.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control array substrate and a touch control display apparatus that substantially obviate one or more of the problems due to limitations and disadvantages of the related art. In one aspect, the present disclosure provides a touch control array substrate. In some embodiments, the touch control array substrate includes a touch electrode layer having a plurality of touch electrode blocks configured to detect a touch and configured to provide at least a portion of back light for image display in the touch control array substrate by reflecting ambient light.

Figure 1:
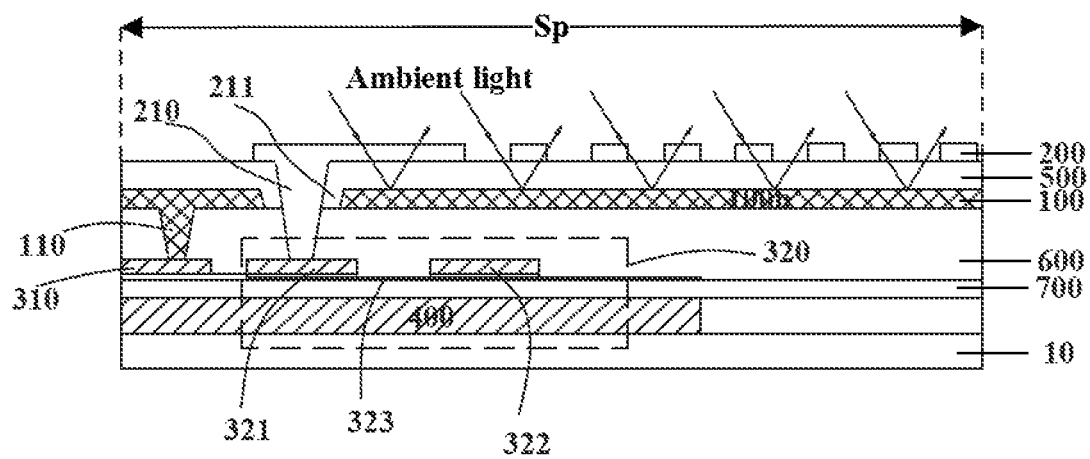
FIG. 1 is a cross-sectional view of a touch control array substrate in some embodiments according to the present disclosure.
Figure 2:
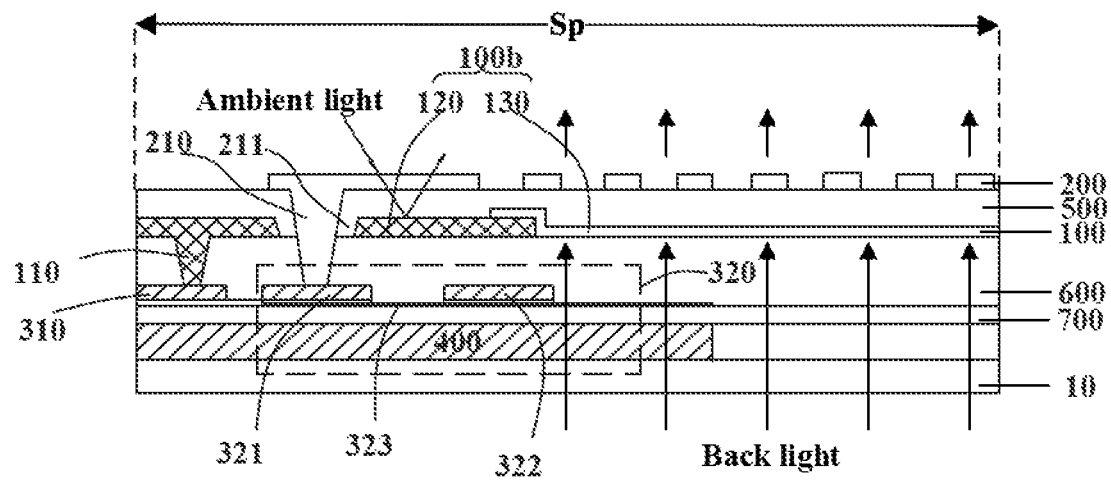
FIG. 2 is a cross-sectional view of a touch control array substrate in some embodiments according to the present disclosure.

FIGS. 1 and 2 are cross-sectional views of touch control array substrates in some embodiments according to the present disclosure. The touch control array substrate has a plurality of subpixel areas Sp. Referring to FIGS. 1 and 2, the touch control array substrate in some embodiments includes a touch electrode layer 100 having a plurality of touch electrode blocks 100b configured to detect a touch and configured to provide at least a portion of back light for image display in the touch control array substrate by reflecting ambient light. The touch control array substrate further includes a base substrate 10, a plurality of thin film transistors 320 on the base substrate 10, each of which in one of the plurality of subpixel areas Sp. Optionally, the touch electrode layer 100 is on a side of the plurality of thin film transistors 320 distal to the base substrate 10. Optionally, at least a portion of each of the plurality of touch electrode blocks 100b is reflective. Optionally, and referring to FIG. 1, substantially an entirety of each of the plurality of touch electrode blocks 100b is reflective. Optionally, and referring to FIG. 2, each of the plurality of touch electrode blocks 100b includes a reflective part 120 and a substantially transparent part 130. The reflective part 120 is light reflective, and the substantially transparent part 130 is substantially transparent. As used herein, the term "substantially transparent" means at least 50 percent (e.g., at least 60 percent, at least 70 percent, at least 80 percent, at least 90 percent, and at least 95 percent) of light in the visible wavelength range transmitted therethrough.

In the present touch control array substrate, at least a portion of each of the plurality of touch electrode blocks 100b is light reflective. When ambient light irradiates on the touch control array substrate (or a display panel having the touch control array substrate), the ambient light transmits through the touch control array substrate (e.g., enters inside of the touch control array substrate), and is reflected by the reflective portion of the plurality of touch electrode blocks 100b. The reflected light then exit the touch control array substrate (e.g., transmitting through the liquid crystal layer) from its light emitting surface. Thus, the plurality of touch electrode blocks 100b (e.g., the reflective portion thereof) provides at least a portion of back light for image display. The luminance level of the touch control array substrate or the display panel having the touch control array substrate can be enhanced by the plurality of touch electrode blocks 100b, making the display panel more energy efficient.

Optionally, each of the plurality of touch electrode blocks 100b is light reflective.

Referring to FIG. 1, in some embodiments, substantially an entirety of each of the plurality of touch electrode blocks 100b is light reflective. Various appropriate materials may be used for making the plurality of touch electrode blocks 100b. Examples of materials suitable for making the plurality of touch electrode blocks 100b include, but are not limited to, metals and alloys having high reflectivity, such as silver and aluminum. Optionally, when substantially an entirety of each of the plurality of touch electrode blocks 100b is light reflective, a back light is not required for image display in the touch control array substrate or the display panel having the touch control array substrate, as the light reflected by the plurality of touch electrode blocks 100b is adequate for image display with a satisfactory luminance level.

Referring to FIG. 2, in some embodiments, each of the plurality of touch electrode blocks 100b includes a reflective part 120 and a substantially transparent part 130 electrically connected to each other. Various appropriate materials may be used for making the reflective part 120. Examples of materials suitable for making the reflective part 120 include, but are not limited to, metals and alloys having high reflectivity, such as silver and aluminum. Various appropriate materials may be used for making the substantially transparent part 130. Examples of materials suitable for making the substantially transparent part 130 include, but are not limited to, transparent conductive materials such as metal oxides (e.g., indium tin oxide). Optionally, when each of the plurality of touch electrode blocks 100b includes the reflective part 120 and the substantially transparent part 130, a display apparatus having the touch control array substrate may further include a back light. The light reflected by the reflective part 120 provides only a portion of back light for image display in the touch control array substrate. Optionally, the back light in the display apparatus is configured to be turned on when a level of ambient light intensity is relatively low, and configured to be turned off when the level of ambient light intensity is relatively high.

In some embodiments, the touch control array substrate is an in-cell type touch control array substrate having both a touch detection function and an image display function. Referring to FIG. 1 and FIG. 2, the touch control array substrate in some embodiments further includes a pixel electrode 200 in each of the plurality of subpixel areas Sp. The pixel electrode 200 is insulated from the touch electrode layer 100. Optionally, the touch control array substrate further includes a passivation layer 500 between the pixel electrode 200 and the touch electrode layer 100. Optionally, the pixel electrode 200 is on a side of the passivation layer 500 distal to the touch electrode layer 100.

In some embodiments, an orthographic projection of the pixel electrode 200 on the base substrate 10 at least partially overlaps with an orthographic projection of one of the plurality of touch electrode blocks 100b on the base substrate 10. Optionally, the orthographic projection of each of the plurality of touch electrode blocks 100b on the base substrate 10 substantially covers the orthographic projection of the pixel electrode 200 on the base substrate 10. Optionally, each of the plurality of subpixel areas Sp includes one of the plurality of touch electrode blocks 100b, each of the plurality of touch electrode blocks 100b in one of the plurality of subpixel areas Sp is spaced apart from adjacent touch electrode blocks of the plurality of touch electrode blocks 100b in adjacent subpixel areas of the plurality of subpixel areas Sp. Optionally, each of the plurality of touch electrode blocks 100b spans over multiple subpixel areas of the plurality of subpixel areas Sp, an orthographic projection of each of the plurality of touch electrode blocks 100b on the base substrate 10 at least partially overlaps with an orthographic projection of each of multiple ones of the pixel electrodes 200 in multiple subpixel areas of the plurality of subpixel areas Sp. Optionally, the orthographic projection of each of the plurality of touch electrode blocks 100b on the base substrate 10 substantially covers an orthographic projection of multiple ones of the pixel electrodes 200 in multiple subpixel areas of the plurality of subpixel areas Sp.

In some embodiments, the touch control array substrate is configured to be operated in a time-division driving mode. The time-division driving mode includes a display mode and a touch control mode. In the display mode, a data signal is provided to the pixel electrode 200 for image display. Optionally, in the display mode, the plurality of touch electrode blocks 100b are a plurality of common electrodes for applying a common voltage signal during the display mode. In the touch control mode, the plurality of touch electrode blocks 100b are touch electrode blocks for conducting touch signals during the touch control mode. Optionally, the touch electrode layer 100 is a self-capacitive touch electrode layer. Optionally, the touch electrode layer 100 is a mutual-capacitive touch electrode layer.

In some embodiments, the pixel electrode 200 is made of a substantially transparent conductive material. Various appropriate materials may be used for making the pixel electrode 200. Examples of materials suitable for making the pixel electrode 200 include, but are not limited to, transparent conductive materials such as metal oxides (e.g., indium tin oxide), and nano-metals such as nano-silver. In some embodiments, the touch electrode layer 100 is on a side of the plurality of thin film transistor 320 distal to the base substrate 10, the passivation layer 500 is on a side of the touch electrode layer 100 distal to the plurality of thin film transistors 320, and the pixel electrode 200 is on a side of the passivation layer 500 distal to the touch electrode layer 100. Ambient light transmits through the pixel electrode 200 (substantially transparent), and is reflected by the plurality of touch electrode blocks (e.g., the reflective part 120 of the plurality of touch electrode blocks 100b). The reflected light then exits the touch control array substrate (e.g., transmitting through the liquid crystal layer) from its light emitting surface.

In some embodiments, the touch control array substrate is an array substrate in a liquid crystal display apparatus. The liquid crystal display apparatus further includes a counter substrate facing the touch control army substrate, and a liquid crystal layer between the touch control array substrate and the counter substrate. In the display mode, a data signal is applied to the pixel electrode 200 to drive the liquid crystal molecules in the liquid crystal layer to rotate. The light reflected by the plurality of touch electrode blocks 100b transmits through the liquid crystal layer, thereby realizing image display of various grayscales.

In a liquid crystal display apparatus having the touch control array substrate described herein, the touch electrode layer is on a side of the pixel electrode 200 distal to the liquid crystal layer. By having this structure, an interference by the touch electrode layer 100 to the electrical field generated by the pixel electrode 200 for driving image display, if any, can be substantially minimized, without affecting the normal image display in the liquid crystal display apparatus.

Referring to FIG. 1 and FIG. 2, in some embodiments, each of the plurality of thin film transistors 320 includes a gate electrode 400, an active layer 323, a source electrode 322 and a drain electrode 321. Optionally, the plurality of thin film transistors 320 are a plurality of top-gate thin film transistors. Optionally, the plurality of thin film transistors 320 are a plurality of bottom-gate thin film transistors. Optionally, the touch control array substrate further includes a gate insulating layer 700 between the active layer 323 and the gate electrode 400.

In some embodiments, the touch electrode layer 100 includes an array of the plurality of touch electrode blocks 100b arranged in rows and columns. Referring to FIG. 1 and FIG. 2, in some embodiments, the touch control array substrate further includes a plurality of touch signal lines 310 connected to the plurality of touch electrode blocks 100b. Optionally, each of the plurality of touch signal lines 310 is electrically connected to one of the plurality of touch electrode blocks 100b. Optionally, one or more of the plurality of touch signal lines 310 are configured to provide touch scanning signal(s) to one or more of the plurality of touch electrode blocks 100b. Optionally, one or more of the plurality of touch signal lines 310 are configured to transmit touch sensing signal(s) from the one or more of the plurality of touch electrode blocks 100b.

Figure 3:
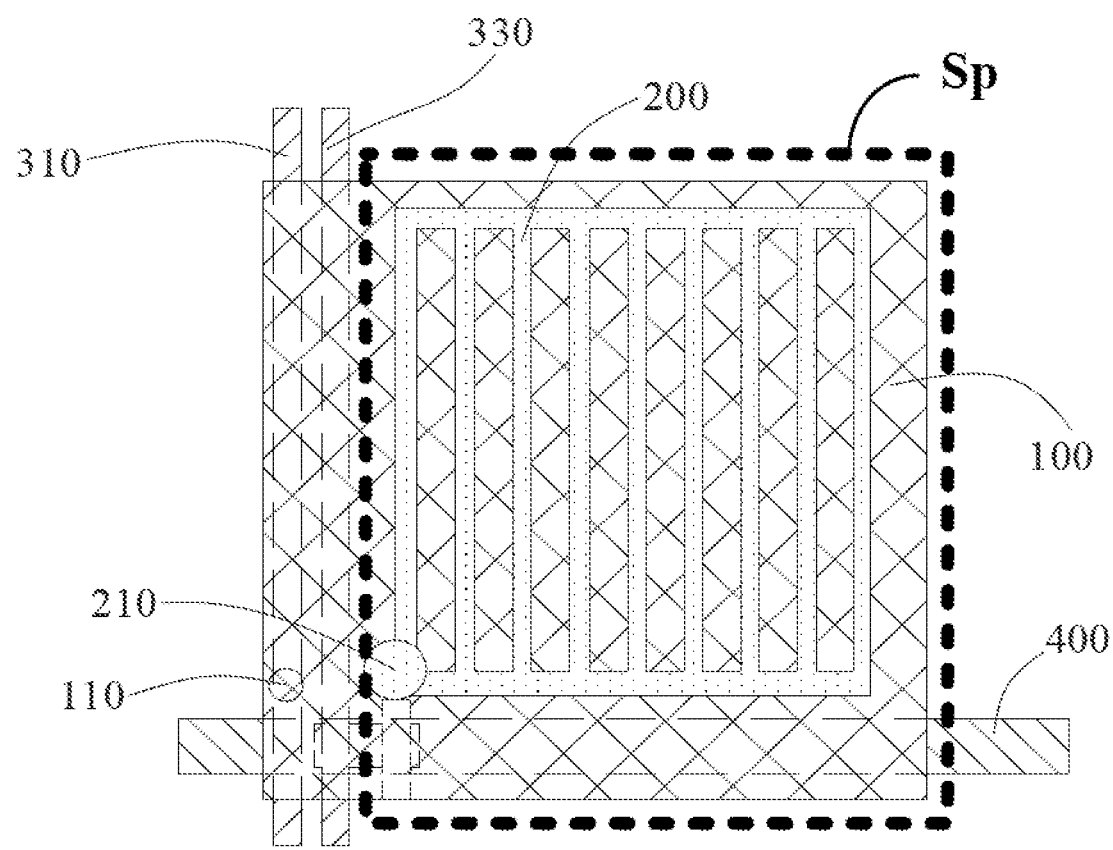
FIG. 3 is a plan view of a touch control array substrate in some embodiments according to the present disclosure.

In some embodiments, the touch control array substrate includes an array of the pixel electrode 200 arranged in rows and columns. FIG. 3 is a plan view of a touch control array substrate in some embodiments according to the present disclosure. Referring to FIG. 3, the touch control array substrate in some embodiments further includes a plurality of data lines 330, one of which is configured to provide a data signal to the pixel electrode 200. The plurality of data lines 330 are respectively connected to source electrodes of the plurality of thin film transistors in the touch control array substrate. Optionally, each of the plurality of columns of pixel electrodes correspond to one of the plurality of data lines 330. For example, a same one of the plurality of data lines 330 is configured to provide data signals to pixel electrodes in a same column of the plurality of columns of pixel electrodes, thereby driving the liquid crystal molecules in the liquid crystal layer to rotate.

Optionally, each of the plurality of touch signal lines 310 is in an inter-subpixel region between two adjacent subpixel areas of the plurality of subpixel areas. Optionally, each of the plurality of data lines 330 is in an inter-subpixel region between two adjacent subpixel areas of the plurality of subpixel areas.

In some embodiments, the plurality of data lines 330 and the plurality of touch signal lines 310 are in a same layer. e.g., formed in a same patterning process using a same material and using a same mask plate. As used herein, the term "same layer" refers to the relationship between the layers simultaneously formed in the same step. In one example, the plurality of data lines 330 and the plurality of touch signal lines 310 are in a same layer when they are formed as a result of one or more steps of a same patterning process performed in a same layer of material. In another example, the plurality of data lines 330 and the plurality of touch signal lines 310 can be formed in a same layer by simultaneously performing the step of forming the plurality of data lines 330 and the step of forming the plurality of touch signal lines 310. The term "same layer" does not always mean that the thickness of the layer or the height of the layer in a cross-sectional view is the same. Referring to FIG. 1 and FIG. 2, in some embodiments, the touch control array substrate further includes an inter-layer dielectric layer 600 on a side of the plurality of data lines 330 and the plurality of touch signal lines 310 distal to the base substrate 10, a touch electrode layer 100 on a side of the inter-layer dielectric layer 600 distal to the base substrate 10, a passivation layer 500 on a side of the touch electrode layer 100 distal to the base substrate 10, and a pixel electrode 200 on a side of the passivation layer 500 distal to the base substrate 10. Optionally, the plurality of data lines 330, the plurality of touch signal lines 310, the source electrode 322, and the drain electrode 321 are in a same layer, e.g., formed in a same patterning process using a same material and using a same mask plate.

In some embodiments, the touch control army substrate further includes a plurality of first vias 110 extending through the inter-layer dielectric layer 600, each of the plurality of touch electrode blocks is electrically connected to one of the plurality of touch signal lines 310 through one of the plurality of first vias 110. In some embodiments, the touch control array substrate further includes a plurality of second vias 210 extending through the passivation layer 500 and the inter-layer dielectric layer 600, the pixel electrode 200 is electrically connected to a drain electrode 321 of one of the plurality of thin film transistors 320 through one of the plurality of second vias 210.

Various appropriate materials and various appropriate fabricating methods may be used for making the inter-layer dielectric layer 600. For example, an insulating material may be deposited on the substrate by a plasma-enhanced chemical vapor deposition (PECVD) process and patterned. Examples of materials suitable for making the inter-layer dielectric layer 600 include, but are not limited to, silicon oxide ($SiO_x$), silicon nitride ($SiN_x$), silicon oxynitride ($SiO_xN_y$) or a combination thereof.

Various appropriate materials and various appropriate fabricating methods may be used for making the passivation layer 500. For example, an insulating material may be deposited on the substrate by a plasma-enhanced chemical vapor deposition (PECVD) process and patterned. Examples of materials suitable for making the passivation layer 500 include, but are not limited to, silicon oxide ($SiO_x$), silicon nitride ($SiN_x$), silicon oxynitride ($SiO_xN_y$) or a combination thereof.

In some embodiments, the touch control array substrate further includes a third via 211 extending through the touch electrode layer 100, the passivation layer 500 extending through the third via 211 to be in contact with the inter-layer dielectric layer 600. The third via 211 surrounds the second via 210, and the second via 210 extends through the third via 211.

Referring to FIG. 3, each of the plurality of subpixel areas Sp includes one of the plurality of touch electrode blocks 100b, each of the plurality of touch electrode blocks 100b in one of the plurality of subpixel areas Sp is spaced apart from adjacent touch electrode blocks of the plurality of touch electrode blocks 100b in adjacent subpixel areas of the plurality of subpixel areas Sp. Optionally, the orthographic projection of each of the plurality of touch electrode blocks 100b on the base substrate 10 substantially covers the orthographic projection of the pixel electrode 200 on the base substrate 10.

Figure 4:
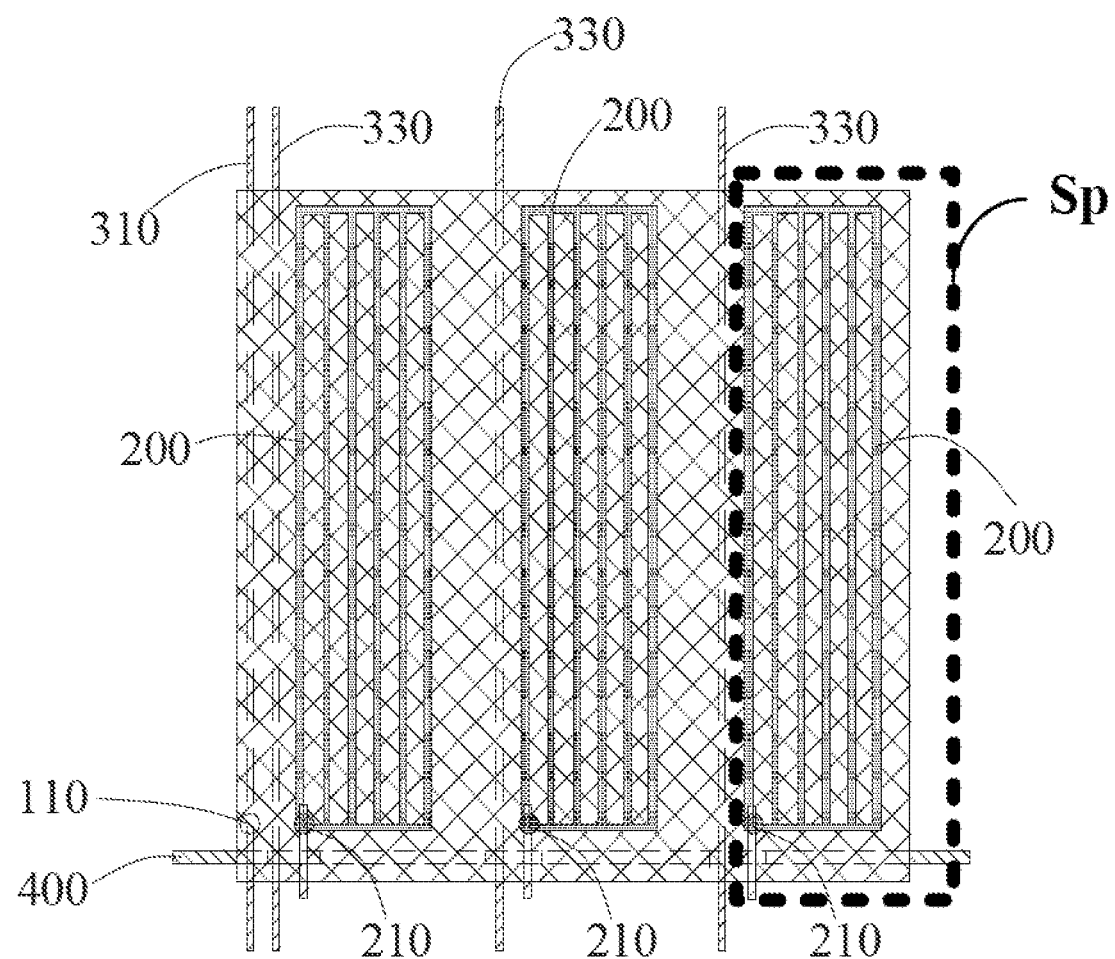
FIG. 4 is a plan view of a touch control array substrate in some embodiments according to the present disclosure.
Figure 5:
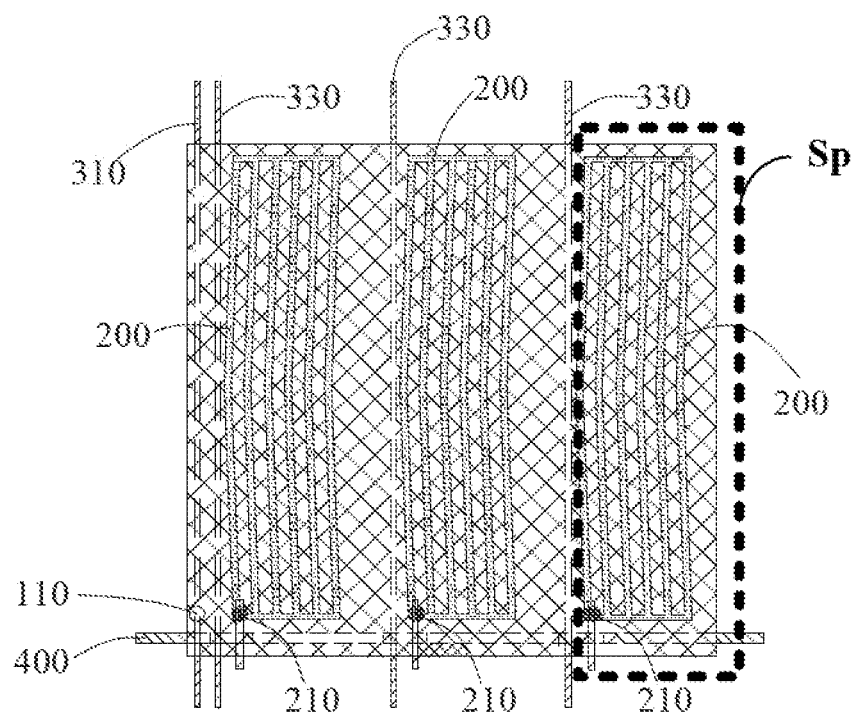
FIG. 5 is a plan view of a touch control array substrate in some embodiments according to the present disclosure.

FIG. 4 is a plan view of a touch control array substrate in some embodiments according to the present disclosure. FIG. 5 is a plan view of a touch control array substrate in some embodiments according to the present disclosure. Referring to FIG. 4 and FIG. 5, each of the plurality of touch electrode blocks 100b spans over multiple subpixel areas of the plurality of subpixel areas Sp, an orthographic projection of each of the plurality of touch electrode blocks 100b on the base substrate 10 at least partially overlaps with an orthographic projection of each of multiple ones of the pixel electrodes 200 in multiple subpixel areas of the plurality of subpixel areas Sp. Optionally, the orthographic projection of each of the plurality of touch electrode blocks 100b on the base substrate 10 substantially covers an orthographic projection of multiple ones of the pixel electrodes 200 in multiple subpixel areas of the plurality of subpixel areas Sp.

Referring to FIG. 4, in some embodiments, the pixel electrode 200 includes a plurality of branches parallel to each other and spaced apart by a plurality of slits. Optionally, the pixel electrode 200 is a single-domain pixel electrode.

In some embodiments, the pixel electrode 200 is a multi-domain pixel electrode. Referring to FIG. 5, the pixel electrode 200 in some embodiments includes at least a first domain and a second domain, branches and slits in the first domain extending substantially along a first direction, and branches and slits in the second domain extending substantially along a second direction.

Figure 6:
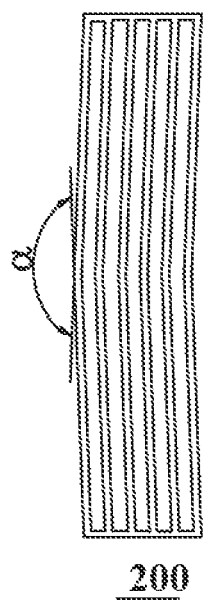
FIG. 6 is a schematic diagram illustrating the structure of a pixel electrode of the touch control array substrate in FIG. 5.

FIG. 6 is a schematic diagram illustrating the structure of a pixel electrode of the touch control array substrate in FIG. 5. Referring to FIG. 6, the first direction and the second direction form an included angle α.

Figure 7:
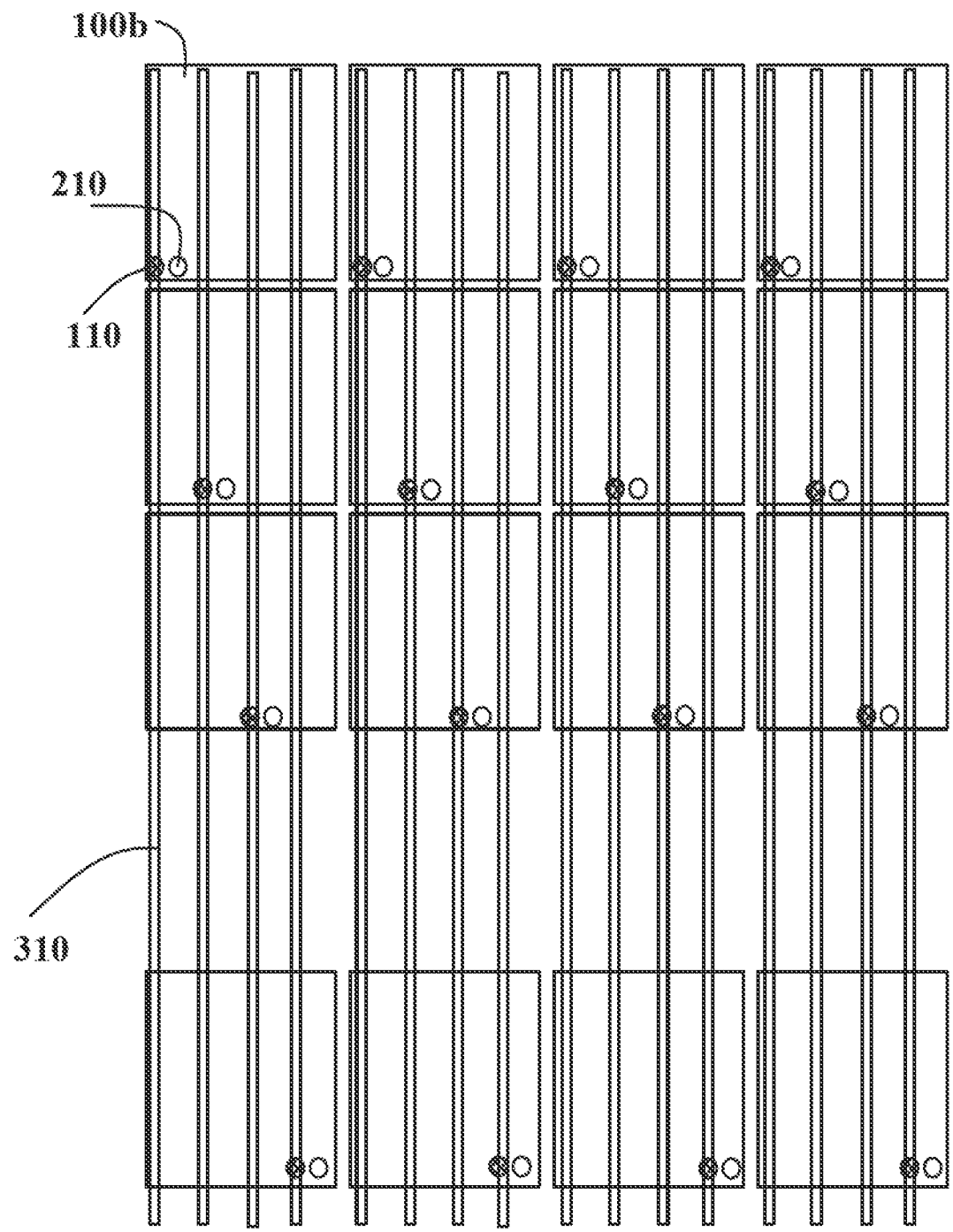
FIG. 7 is a plan view of a touch control array substrate in some embodiments according to the present disclosure.

FIG. 7 is a plan view of a touch control array substrate in some embodiments according to the present disclosure. Referring to FIG. 7, the touch control array substrate in some embodiments includes an array of a plurality of touch electrode blocks 100b and a plurality of touch signal lines 310. Optionally, each of the plurality of touch electrode blocks 100b is electrically connected to one of the plurality of touch signal lines 310, as shown in FIG. 7. Each of the plurality of touch electrode blocks 100b is electrically connected to one of the plurality of touch signal lines 310 through one or more of the plurality of first vias 110 extending through the inter-layer dielectric layer (as shown in FIG. 1 and FIG. 2). The pixel electrode is electrically connected to the drain electrode of one of the plurality of thin film transistors through one or more of the plurality of second vias 210 extending through the passivation layer and the inter-layer dielectric layer. Optionally, each of the plurality of touch electrode blocks 100b is electrically connected to one of the plurality of touch signal lines 310 through a single one of the plurality of first vias 110. Optionally, each of the pixel electrode is electrically connected to the drain electrode of one of the plurality of thin film transistors through a single one of the plurality of second vias 210.

Figure 8A:
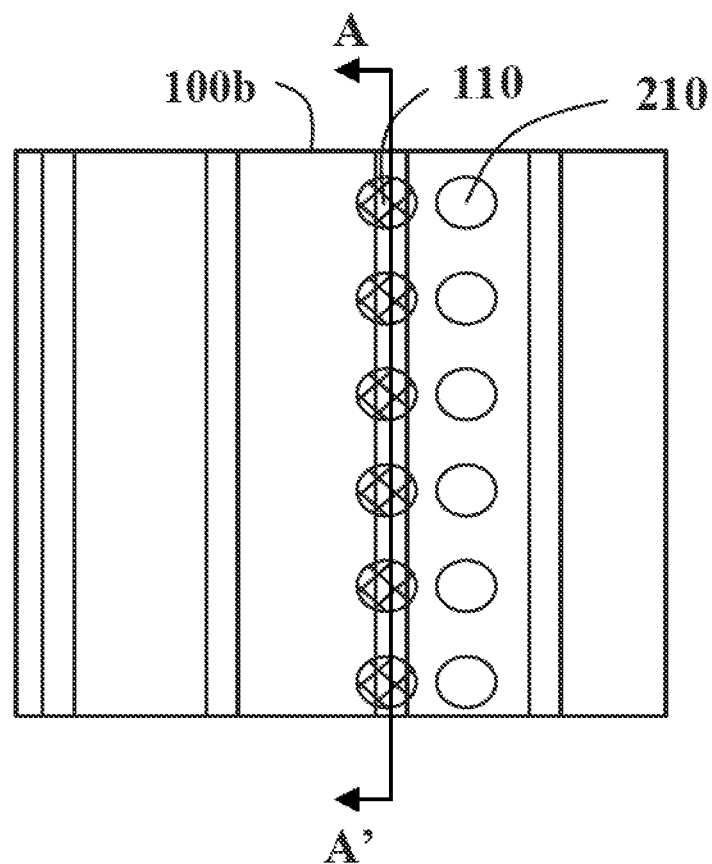
FIG. 8A is a zoom-in view of a touch control array substrate in some embodiments according to the present disclosure.
Figure 8B:
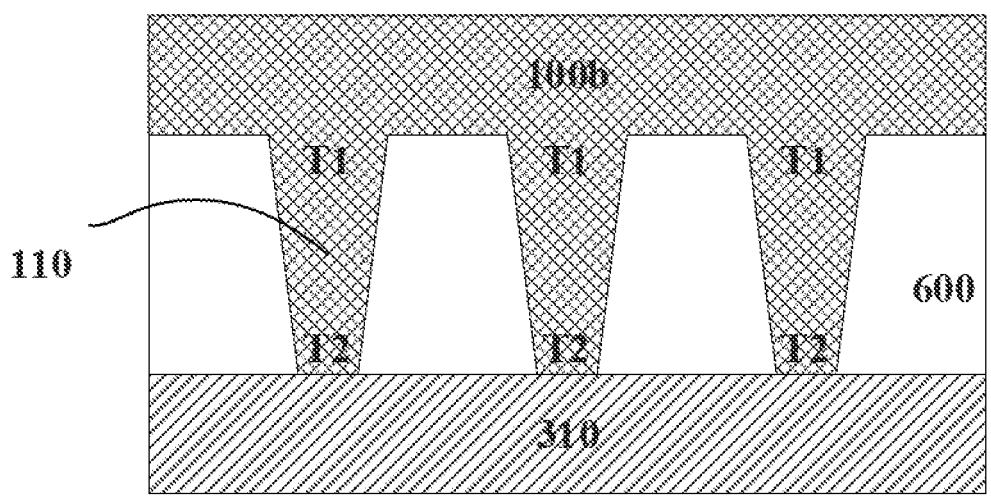
FIG. 8B is a cross-sectional view along a A-A' line in FIG. 8A.

FIG. 8A is a zoom-in view of a touch control array substrate in some embodiments according to the present disclosure. FIG. 8B is a cross-sectional view along a A-A' line in FIG. 8A. Referring to FIG. 8A and FIG. 8B, each of the plurality of touch electrode blocks 100b is electrically connected to one of the plurality of touch signal lines 310 through multiple ones of the plurality of first vias 110, first terminals T1 of the multiple ones of the plurality of first vias 110 are connected to a same one of the plurality of touch electrode blocks 100b, and second terminals T2 of the multiple ones of the plurality of first vias 110 are connected to a same one of the plurality of touch signal lines 310. Referring to FIG. 8A, in some embodiments, the pixel electrode is electrically connected to the drain electrode of one of the plurality of thin film transistors through one of the plurality of second vias 210, a first terminal of the one of the plurality of second vias 210 are connected to the pixel electrode, and a second terminal of the one of the plurality of second vias 210 are connected to one of the plurality of data lines. Optionally, each of the plurality of touch electrode blocks 100b corresponds to multiple subpixel areas (e.g., six subpixel areas) of the plurality of subpixel areas.

In another aspect, the present disclosure provides a touch control display apparatus having a touch control array substrate described herein or fabricated by a method described herein. In the present touch control display apparatus, at least a portion of each of the plurality of touch electrode blocks is light reflective. When ambient light irradiates on the touch control display apparatus, the ambient light enters inside of the touch control display apparatus, and is reflected by the reflective portion of the plurality of touch electrode blocks. The reflected light then exit the touch control display apparatus (e.g., transmitting through the liquid crystal layer) from its light emitting surface. Thus, the plurality of touch electrode blocks (e.g., the reflective portion thereof) provides at least a portion of back light for image display. The luminance level of the touch control display apparatus can be enhanced by the plurality of touch electrode blocks, making the display panel more energy efficient.

Optionally, the touch control display apparatus is an in-cell type touch control display apparatus having both a touch detection function and an image display function.

Optionally, the touch control display apparatus is a liquid crystal touch control display apparatus. The liquid crystal touch control display apparatus includes the touch control array substrate described herein, a counter substrate facing the touch control array substrate, and a liquid crystal layer between the touch control array substrate and the counter substrate.

Optionally, the touch control display apparatus is an electrophoretic touch control display apparatus. The electrophoretic touch control display apparatus includes the touch control array substrate described herein, a counter substrate facing the touch control array substrate, and an electrophoretic layer between the touch control array substrate and the counter substrate.

Examples of appropriate touch control display apparatuses include, but are not limited to, an electronic paper, a mobile phone, a tablet computer, a television, a monitor, a notebook computer, a digital album, a GPS, etc.

Figure 9:
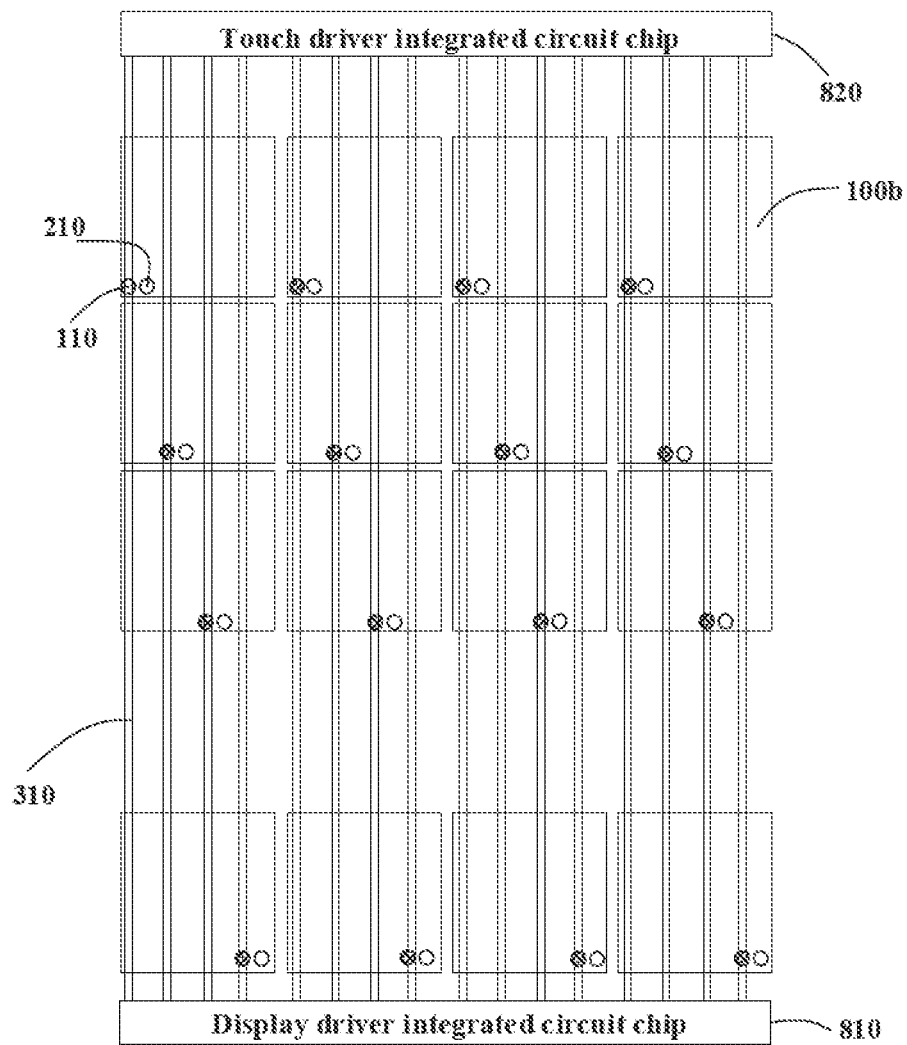
FIG. 9 is a schematic diagram of the structure of a display apparatus in some embodiments according to the present disclosure.

In some embodiments, the touch control display apparatus is configured to be operated in a time-division driving mode. The time-division driving mode includes a display mode and a touch control mode. FIG. 9 is a schematic diagram of the structure of a display apparatus in some embodiments according to the present disclosure. In the display mode, a data signal is provided to the pixel electrode for image display. Optionally, in the display mode, the plurality of touch electrode blocks 100b are a plurality of common electrodes for applying a common voltage signal during the display mode. Referring to FIG. 9, the touch control display apparatus further includes a display driver integrated circuit chip 810 electrically connected to the plurality of touch signal lines 310. The display driver integrated circuit chip 810 provides the common voltage signal to the plurality of touch electrode blocks 100b during the display mode.

In the touch control mode, the plurality of touch electrode blocks 100b are touch electrode blocks for conducting touch signals during the touch control mode. Optionally, the touch electrode layer 100 is a self-capacitive touch electrode layer. Optionally, the touch electrode layer 100 is a mutual-capacitive touch electrode layer. Referring to FIG. 9, the touch control display apparatus further includes a touch driver integrated circuit chip 820 electrically connected to the plurality of touch signal lines 310. Optionally, the touch driver integrated circuit chip 820 provides touch scanning signals to the plurality of touch electrode blocks 100b during the touch control mode.

Optionally, the display driver integrated circuit chip 810 and the touch driver integrated circuit chip 820 are integrated as a touch and display driver integrated (TDDI) circuit chip.

Figure 10:
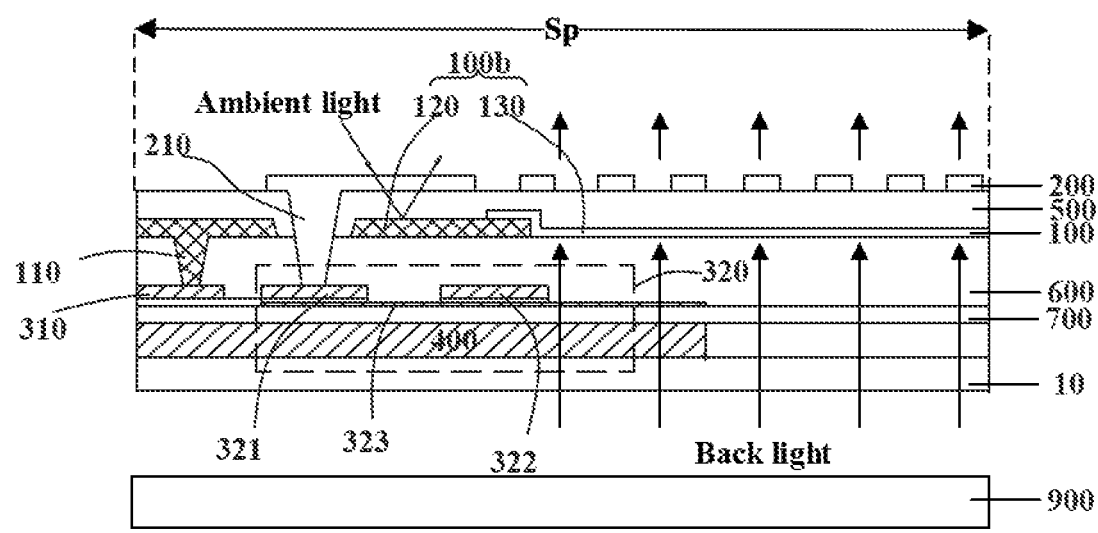
FIG. 10 is a schematic diagram of the structure of a display apparatus in some embodiments according to the present disclosure.

FIG. 10 is a schematic diagram of the structure of a display apparatus in some embodiments according to the present disclosure. Referring to FIG. 10, in some embodiments, each of the plurality of touch electrode blocks 100b includes a reflective part 120 and a substantially transparent part 130. The reflective part 120 is light reflective, and the substantially transparent part 130 is substantially transparent. The touch control display apparatus further includes a back light module 900 configured to provide back light through the substantially transparent part 130. Optionally, the back light module 900 in the touch control display apparatus is configured to be turned on when a level of ambient light intensity is relatively low, and configured to be turned off when the level of ambient light intensity is relatively high. In one example, the back light module is configured to be turned on when a level of ambient light intensity is lower than a threshold value, and configured to be turned off when the level of ambient light intensity is equal to or higher than the threshold value.

In another aspect, the present disclosure provides a method of fabricating a touch control array substrate. In some embodiments, the method includes forming a touch electrode layer having a plurality of touch electrode blocks configured to detect a touch and configured to provide at least a portion of back light for image display in the touch control array substrate by reflecting ambient light. In some embodiments, the method further includes forming a plurality of thin film transistors on a base substrate, each of the plurality of thin film transistors formed in one of a plurality of subpixel areas; forming a pixel electrode in each of the plurality of subpixel areas; and forming a passivation layer on a side of the pixel electrode layer distal to the base substrate. Optionally, the touch electrode layer is formed on a side of the passivation layer distal to the pixel electrode. Optionally, the pixel electrode and the touch electrode layer are formed so that an orthographic projection of the pixel electrode on the base substrate at least partially overlaps with an orthographic projection of one of the plurality of touch electrode blocks on the base substrate.

In some embodiments, each of the plurality of touch electrode blocks is formed in one of the plurality of subpixel areas, and is formed to be spaced apart from adjacent touch electrode blocks of the plurality of touch electrode blocks in adjacent subpixel areas of the plurality of subpixel areas.

In some embodiments, each of the plurality of touch electrode blocks is formed in multiple subpixel areas of the plurality of subpixel areas. Optionally, the pixel electrode and the touch electrode layer are formed so that an orthographic projection of each of the plurality of touch electrode blocks on the base substrate at least partially overlaps with an orthographic projection of each of multiple ones of the pixel electrodes in multiple subpixel areas of the plurality of subpixel areas.

In some embodiments, each of the plurality of touch electrode blocks is formed to have at least a portion that is light reflective. In the touch control array substrate fabricated by the present method, the plurality of touch electrode blocks are configured to provide at least a portion of back light for image display.

Optionally, substantially an entirety of each of the plurality of touch electrode blocks is formed to be light reflective. In the touch control may substrate fabricated by the present method, the plurality of touch electrode blocks are configured to provide back light for image display.

Optionally, each of the plurality of touch electrode blocks is formed to include a reflective part and a substantially transparent part. The reflective part is light reflective, the substantially transparent part is substantially transparent. In the touch control array substrate fabricated by the present method, the reflective part of each of the plurality of touch electrode blocks is configured to provide a portion of back light for image display.

In some embodiments, the method further includes forming a plurality of touch signal lines respectively connected to the plurality of touch electrode blocks; and forming a plurality of data lines, one of which is configured to provide a data signal to the pixel electrode.

In some embodiments, the method further includes forming an inter-layer dielectric layer on a side of the plurality of data lines and the plurality of touch signal lines distal to the base substrate; forming a passivation layer on a side of the touch electrode layer distal to the base substrate; and forming a pixel electrode on a side of the passivation layer distal to the base substrate. Optionally, the touch electrode layer is formed on a side of the inter-layer dielectric layer distal to the base substrate. Optionally, the plurality of touch signal lines and the plurality of data lines are in a same layer, e.g., formed in a same patterning process using a same material and using a same mask plate.

In some embodiments, the step of forming the plurality of thin film transistors includes forming a gate electrode, forming an active layer, forming a source electrode and a drain electrode, and forming a gate insulating layer between the active layer and the gate electrode. Optionally, the plurality of data lines, the plurality of touch signal lines, the source electrode, and the drain electrode are in a same layer, e.g., formed in a same patterning process using a same material and using a same mask plate.

In some embodiments, the method further includes forming a plurality of first vias extending through the inter-layer dielectric layer; and forming a plurality of second vias extending through the passivation layer and the inter-layer dielectric layer. Optionally, each of the plurality of touch electrode blocks is formed to be electrically connected to one of the plurality of touch signal lines through one or more of the plurality of first vias; and the pixel electrode is formed to be electrically connected to a drain electrode of one of the plurality of thin film transistors through one or more of the plurality of second vias.

In some embodiments, the touch electrode layer is formed so that each of the plurality of touch electrode blocks is electrically connected to one of the plurality of touch signal lines through multiple ones of the plurality of first vias, first terminals of the multiple ones of the plurality of first vias are connected to a same one of the plurality of touch electrode blocks, and second terminals of the multiple ones of the plurality of first vias are connected to a same one of the plurality of touch signal lines.

In another aspect, the present disclosure further provides a method of forming a touch control display apparatus. The method in some embodiments includes forming a touch control array substrate by a method described herein; forming a counter substrate, and assembling the touch control array substrate and the counter substrate to form a cell. In some embodiments, the method further includes providing a back light module on a side of the touch control array substrate distal to the counter substrate. Optionally, the method further includes forming a display driver integrated circuit chip electrically connected to the plurality of touch signal lines, and forming a touch driver integrated circuit chip electrically connected to the plurality of touch signal lines. Optionally, the method includes forming a touch and display driver integrated (TDDI) circuit chip electrically connected to the plurality of touch signal lines.

In another aspect, the present disclosure further provides a method of controlling a touch control display apparatus described herein or fabricated by a method described herein. In some embodiments, the method includes operating the touch control display apparatus in a time-division driving mode including a display mode and a touch control mode. In the display mode, the method includes applying a common voltage signal to the plurality of touch electrode blocks. In the touch control mode, the method includes providing touch scanning signals to the plurality of touch electrode blocks.

In some embodiments, the touch control array substrate further includes a plurality of touch signal lines respectively connected to the plurality of touch electrode blocks, and a plurality of data lines, one of which is configured to provide a data signal to the pixel electrode. Optionally, the touch control display apparatus further includes a display driver integrated circuit chip electrically connected to the plurality of touch signal lines, and a touch driver integrated circuit chip electrically connected to the plurality of touch signal lines. Optionally, the method further includes generating the common voltage signal by the display driver integrated circuit chip and providing the common voltage signal to the plurality of touch electrode blocks during the display mode; and generating touch scanning signals by the touch driver integrated circuit chip and providing the touch scanning signals to the plurality of touch electrode blocks during the touch control mode. Optionally, the display driver integrated circuit chip and the touch driver integrated circuit chip are integrated as a touch and display driver integrated (TDDI) circuit chip.

In some embodiments, the method further includes turning on the back light module when a level of ambient light intensity is lower than a threshold value; and turning off the back light module when the level of ambient light intensity is equal to or higher than the threshold value.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control array substrate, comprising:
a base substrate;
a plurality of driving thin film transistors on the base substrate, a respective one of the plurality of driving thin film transistors in a respective one of a plurality of subpixel areas;
a pixel electrode in the respective one of the plurality of subpixel areas, electrically connected to a drain electrode of the respective one of the plurality of driving thin film transistors;
a touch electrode layer having a plurality of touch electrode blocks configured to detect a touch and configured to provide at least a portion of back light for image display in the touch control array substrate by reflecting ambient light; and a plurality of touch signal lines respectively connected to the plurality of touch electrode blocks;

wherein a respective one of the plurality of touch electrode blocks comprises a reflective part and a substantially transparent part;

the reflective part is light reflective;

the substantially transparent part is substantially transparent;

the reflective part of the respective one of the plurality of touch electrode blocks is configured to provide a portion of back light for image display;

an orthographic projection of the reflective part on the base substrate at least partially overlaps with an orthographic projection of the respective one of the plurality of driving thin film transistors on the base substrate;

the reflective part is electrically connected to a respective one of the plurality of touch signal lines;

the substantially transparent part is in direct contact with the reflective part, and is electrically connected to the respective one of the plurality of touch signal lines through the reflective part; and an orthographic projection of the substantially transparent part on the base substrate partially overlaps with the orthographic projection of the reflective part on the base substrate.

2. The touch control array substrate of claim 1, further comprising:

a passivation layer on a side of the touch electrode layer away from the base substrate;

wherein the touch electrode layer is on a side of the passivation layer distal to away from the pixel electrode; and an orthographic projection of the pixel electrode on the base substrate at least partially overlaps with an orthographic projection of one of the plurality of touch electrode blocks on the base substrate.

3. The touch control array substrate of claim 2, wherein each of the plurality of touch electrode blocks is in one of the plurality of subpixel areas, and is spaced apart from adjacent touch electrode blocks of the plurality of touch electrode blocks in adjacent subpixel areas of the plurality of subpixel areas.

4. The touch control array substrate of claim 2, wherein each of the plurality of touch electrode blocks spans over multiple subpixel areas of the plurality of subpixel areas; and an orthographic projection of each of the plurality of touch electrode blocks on the base substrate at least partially overlaps with an orthographic projection of each of multiple ones of the pixel electrode in multiple subpixel areas of the plurality of subpixel areas.

5. The touch control array substrate of claim 1, further comprising a plurality of data lines, a respective one of which is configured to provide a data signal to the pixel electrode.

6. The touch control array substrate of claim 5, further comprising an inter-layer dielectric layer on a side of the plurality of data lines and the plurality of touch signal lines away from the base substrate;

a passivation layer on a side of the touch electrode layer distal to away from the base substrate; and a pixel electrode on a side of the passivation layer distal to away from the base substrate;

wherein the touch electrode layer is on a side of the inter-layer dielectric layer distal to away from the base substrate; and the plurality of touch signal lines and the plurality of data lines are in a same layer and comprise a same material.

7. The touch control array substrate of claim 6, wherein the respective one of the plurality of driving thin film transistors comprises a gate electrode, an active layer, a source electrode and a drain electrode, and a gate insulating layer between the active layer and the gate electrode; and the plurality of data lines, the plurality of touch signal lines, the source electrode, and the drain electrode are in a same layer and comprise a same material.

8. The touch control array substrate of claim 6, further comprising a plurality of first vias extending through the inter-layer dielectric layer; and a plurality of second vias extending through the passivation layer and the inter-layer dielectric layer;

wherein the respective one of the plurality of touch electrode blocks is electrically connected to a respective one of the plurality of touch signal lines through one or more of the plurality of first vias; and the pixel electrode is electrically connected to a drain electrode of the respective one of the plurality of driving thin film transistors through one or more of the plurality of second vias.

9. The touch control array substrate of claim 8, wherein the respective one of the plurality of touch electrode blocks is electrically connected to the respective one of the plurality of touch signal lines through multiple ones of the plurality of first vias, first terminals of the multiple ones of the plurality of first vias are connected to a same one of the plurality of touch electrode blocks, and second terminals of the multiple ones of the plurality of first vias are connected to a same one of the plurality of touch signal lines.

10. The touch control array substrate of claim 1, wherein the touch control array substrate is configured to be operated in a time-division driving mode comprising a display mode and a touch control mode;

the plurality of touch electrode blocks are a plurality of common electrodes for applying a common voltage signal during the display mode; and the plurality of touch electrode blocks are touch electrode blocks for conducting touch signals during the touch control mode.

11. A touch control display apparatus, comprising the touch control array substrate of claim 1; and a counter substrate facing the touch control array substrate.

12. The touch control display apparatus of claim 11, wherein the touch control array substrate further comprises:

a passivation layer on a side of the touch electrode layer away from the base substrate;

wherein the touch electrode layer is on a side of the passivation layer distal to away from the pixel electrode; and an orthographic projection of the pixel electrode on the base substrate at least partially overlaps with an orthographic projection of one of the plurality of touch electrode blocks on the base substrate.

13. The touch control display apparatus of claim 12, further comprising a back light module on a side of the touch control array substrate distal to the counter substrate, and configured to provide back light through the substantially transparent part.

14. The touch control display apparatus of claim 13, wherein the back light module is configured to be turned on when a level of ambient light intensity is lower than a threshold value, and configured to be turned off when the level of ambient light intensity is equal to or higher than the threshold value.

15. A method of driving the touch control display apparatus of claim 11, comprising operating the touch control display apparatus in a time-division driving mode comprising a display mode and a touch control mode;
   wherein the method comprises applying a common voltage signal during the display mode to the plurality of touch electrode blocks; and
   conducting touch signals through the plurality of touch electrode blocks during the touch control mode.

16. The method of claim 15, wherein the touch control array substrate further comprises a plurality of data lines, a respective one of which is configured to provide a data signal to the pixel electrode;
   wherein the touch control display apparatus further comprises a display driver integrated circuit chip electrically connected to the plurality of touch signal lines; and
   a touch driver integrated circuit chip electrically connected to the plurality of touch signal lines;
   the method further comprises:
   generating the common voltage signal by the display driver integrated circuit chip and providing the common voltage signal to the plurality of touch electrode blocks during the display mode; and
   generating touch scanning signals by the touch driver integrated circuit chip and providing the touch scanning signals to the plurality of touch electrode blocks during the touch control mode.

17. The method of claim 16, wherein the display driver integrated circuit chip and the touch driver integrated circuit chip are integrated as a touch and display driver integrated (TDDI) circuit chip.

* * * * *